(12) United States Patent
Zhang et al.

(10) Patent No.: US 10,962,077 B2
(45) Date of Patent: Mar. 30, 2021

(54) ACTIVE COMPOSITE VARIABLE DAMPING ROTATIONAL CONTROL DEVICE

(71) Applicant: Qingdao University of Technology, Shandong (CN)

(72) Inventors: Chunwei Zhang, Shandong (CN); Hao Wang, Shandong (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 16/937,492

(22) Filed: Jul. 23, 2020

(65) Prior Publication Data
US 2020/0355237 A1 Nov. 12, 2020

Related U.S. Application Data

(63) Continuation of application No. PCT/CN2019/105657, filed on Sep. 12, 2019.

(30) Foreign Application Priority Data

Feb. 1, 2019 (CN) .......................... 201910103443.6

(51) Int. Cl.
*F16F 9/53* (2006.01)
*F16F 7/10* (2006.01)
(Continued)

(52) U.S. Cl.
CPC .......... *F16F 7/1017* (2013.01); *F16F 15/005* (2013.01); *F16F 15/0275* (2013.01);
(Continued)

(58) Field of Classification Search
CPC ........ F16F 7/1017; F16F 9/535; F16F 15/005; F16F 15/0275; F16F 2222/08;
(Continued)

(56) References Cited

U.S. PATENT DOCUMENTS 5,678,460 A * 10/1997 Walkowc ................ F16F 9/535
464/180
6,095,295 A * 8/2000 Park ........................ F16F 9/535
188/267.2
(Continued)

FOREIGN PATENT DOCUMENTS

| CN | 101576141 A | 11/2009 |
| CN | 102052423 A | 5/2011 |

(Continued)

*Primary Examiner* — Thomas W Irvin

(57) ABSTRACT

An active composite variable damping rotational control device includes a variable damping module and a power module. The variable damping module includes a magnetorheological fluid tank and a rotational inertia wheel. The rotational inertia wheel is arranged in the magnetorheological fluid tank fully filled with magneorheological fluid. The power module includes a device tubular cavity, a driver, an encoder and a speed changer. The driver is fixed on the inner wall of the device tubular cavity. The driver, the encoder and the speed changer are coaxial. A driving shaft of the driver passes through the speed changer and extends into the magnetorheological fluid tank to be fixed perpendicularly at the center of the rotational inertia wheel. The control effect of the present invention may not be greatly affected by the change of a structural form and the change of an external load.

9 Claims, 3 Drawing Sheets

(51) Int. Cl.
  *F16F 15/00* (2006.01)
  *F16F 15/027* (2006.01)
  *B61F 5/24* (2006.01)
  *B64G 1/22* (2006.01)
  *B66C 13/06* (2006.01)
  *E04B 1/98* (2006.01)

(52) U.S. Cl.
  CPC ............... *B61F 5/245* (2013.01); *B64G 1/22* (2013.01); *B66C 13/063* (2013.01); *E04B 1/98* (2013.01); *F16F 2222/08* (2013.01); *F16F 2222/12* (2013.01); *F16F 2224/045* (2013.01); *F16F 2228/066* (2013.01)

(58) Field of Classification Search
  CPC ............ F16F 2222/12; F16F 2224/045; F16F 2228/066; B61F 5/245; B64G 1/22; B66C 13/063; E04B 1/98
  See application file for complete search history.

(56) References Cited

U.S. PATENT DOCUMENTS

| | | | | |
|---|---|---|---|---|
| 6,547,043 | B2* | 4/2003 | Card | B62D 7/224 188/267.2 |
| 7,823,708 | B2* | 11/2010 | Maranville | B62D 7/224 188/267 |
| 9,303,716 | B2* | 4/2016 | Maranville | F16F 9/535 |
| 2007/0137955 | A1* | 6/2007 | Maranville | F16F 9/535 188/267.2 |
| 2011/0017556 | A1* | 1/2011 | Maranville | F16F 9/535 188/267.2 |

FOREIGN PATENT DOCUMENTS

| | | |
|---|---|---|
| CN | 106051025 A | 10/2016 |
| CN | 209511004 U | 10/2019 |
| JP | H11230255 A | 8/1999 |

\* cited by examiner

ACTIVE COMPOSITE VARIABLE DAMPING ROTATIONAL CONTROL DEVICE

TECHNICAL FIELD

The present invention relates to the field of vibration suppression in a system, and particularly relates to an active composite variable damping rotational control device.

BACKGROUND OF THE PRESENT INVENTION

In recent years, highways, railways, bridges, high-rise buildings, large-span space structures, etc. have been continuously built, and structures such as offshore platforms, space stations and the like have also been developed rapidly. These construction facilities and structures may always vibrate under the action of an external load during use, swing under a serious condition and may even be damaged. In order to solve various problems caused by the structural vibration, a vibration control technology emerges at the right moment.

The vibration control technology is mainly classified into the following four aspects: active control, passive control, semi-active control and hybrid control. For various structures, properly mounting a vibration control system can effectively reduce the dynamic response of the structures, thereby alleviating the damage or fatigue damage of the structure caused by the vibration.

The motion of the structure is generally a combination of translational motion and torsional swing. Studies have shown that translationally tuned mass dampers (TMD), active mass dampers/active torque output devices (AMD) need to provide a centrifugal force during the torsional swing, thereby greatly weakening the control effect and even completely losing the function, and consequently being almost useless to control the torsional swing. However, the structural motion form with the torsional swinging motion characteristic is very common, such as the swing of a suspension structure (hooks, cranes, etc.), torsional swing of irregular buildings under the action of wind load, torsional swing of the offshore platform under the coupled effect of ocean waves, wind, ice, etc., torsional swinging motion of spacecrafts and space structures caused by the pose adjustment and the opening of a solar panel in the running process, and the torsional swinging motion of a vehicle body of high-speed railway locomotives caused by small excitation. Therefore, a special control system is needed to automatically overcome (or get rid of) the influence of a gravity field (centrifugal force effect) on the control system, or the working/motion rule of the control system is decoupled from the gravity field, so that the natural vibration of the system is not affected by the gravity, thereby effectively playing the control role of the control system.

Generally speaking, the existing vibration control technology mainly has the following defects: first, the translational motion TMD control device can only control the translational motion of the structure and is useless to control the torsional swing; second, the translational AMD control device can control the torsional swing, but is extremely low in control efficiency, and cannot meet the use requirement; third, a passive rotational inertia tuned damper is effective to control the torsional swinging motion, but needs to perform the complicated frequency modulation for the structure, and is low in control efficiency for some complicated structures, poor in effect, low in robustness, low in controllability, small in application range, etc.; fourth, the active invariable damping rotational control system is small in application range, and is limited in output control power and limited in control effect; and fifth, the active invariable damping rotational control system cannot guarantee the energy utilization rate and cannot meet the need for economy.

The present invention is proposed under this background.

SUMMARY OF THE PRESENT INVENTION

The main purpose of the present invention is to provide an active composite variable damping rotational control device for solving the above problems.

In order to realize the above purpose, the active composite variable damping rotational control device of the present invention includes a variable damping module and a power module.

The variable damping module includes a magnetorheological fluid tank and a rotational inertia wheel. The magnetorheological fluid tank is of a round tube shape. The magnetorheological fluid tank is fully filled with magnetorheological fluid. The rotational inertia wheel is arranged in the magnetorheological fluid tank. The rotational inertia wheel is surrounded by the magnetorheological fluid. Two circular end surfaces of the magnetorheological fluid tank are respectively provided with an electromagnetic gauze.

The power module includes a device tubular cavity, and a driver, an encoder and a speed changer which are fixed in the device tubular cavity. The device tubular cavity is of a cylindrical shape. The device tubular cavity is fixed perpendicularly at the centers of the circular end surfaces of the magnetorheological fluid tank. The driver is fixed on the inner wall of the device tubular cavity. One end, away from the variable damping module, of the driver is provided with the encoder, and one end, facing the variable damping module, of the driver is connected with the speed changer. The driver has a driving shaft. The driving shaft of the driver passes through the speed changer and extends into the magnetorehological fluid tank to be fixed perpendicularly at the center of the rotational inertia wheel.

Further, the present invention also includes a driver support. The driver is fixed on the inner wall of the device tubular cavity through the driver support.

Further, the present invention also includes a controller. The controller is connected with the electromagnetic gauze, the driver and the encoder through circuits.

Further, the rotational inertia wheel is a circular disc shape recessed inwards in the middle. The outer surface of the rotational inertia wheel is provided with strip-shaped grooves or projections. The strip-shaped grooves or projections are used to increase a frictional and contact area between the rotational inertia wheel and the magnetorheological fluid.

Further, the driving shaft of the driver is connected with the rotational inertial wheel through a flange coupler disc.

Further, the device tubular cavity is connected with a controlled structure. The rotational inertia wheel is parallel to a surface of the controlled structure that is subjected to the torsional swing.

Further, the driver, the speed changer and the encoder are coaxial.

Further, the speed changer is a speed reducer.

Further, the driver is a servo motor or a stepper motor.

The present invention has the following beneficial effects:

(1) The rotational damping of the rotational inertia wheel of the active composite variable damping rotational control device of the present invention can be automatically adjusted; the adjustment accuracy is high; the adjustment range is wide; and the application range of the system is wide.

(2) The active composite variable damping rotational control device of the present invention has greater robustness, and the control effect is not greatly affected by the change of the structural form and the change of the external load.

(3) The active composite variable damping rotational control device of the present invention is suitable for the structures with rotational, torsion or torsional swinging motions and is wide in application range.

DESCRIPTION OF NUMERALS IN THE DRAWINGS

Figure 1:
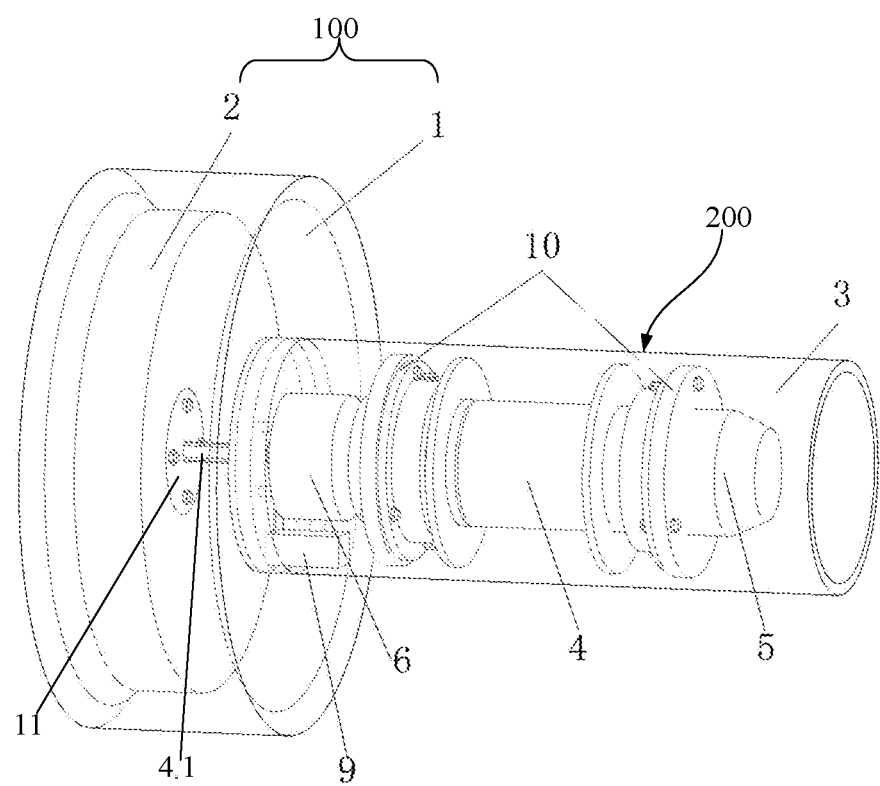
FIG. 1 is a structural schematic diagram of an active composite variable damping rotational control device in one embodiment.

The above drawings include the following reference numerals: 100, variable damping module; 200, power module; 1, magnetorheological fluid tank; 1.1, circular end surface; 1.2, cylinder; 2, rotational inertia wheel; 3, device tubular cavity; 4, driver; 4.1 driving shaft; 5, encoder; 6, speed changer; 7, controlled structure; 8, electromagnetic gauze; 9, controller; 10, driver support; 11, flange coupler disc; and 12, strip-shaped groove or projection.

DETAILED DESCRIPTION OF THE PRESENT INVENTION

The present invention is further described below in combination with the accompanying drawings.

In the present embodiment, a structure with a simple pendulum structure model as a basic mechanical model prototype is taken as an example.

Figure 2:
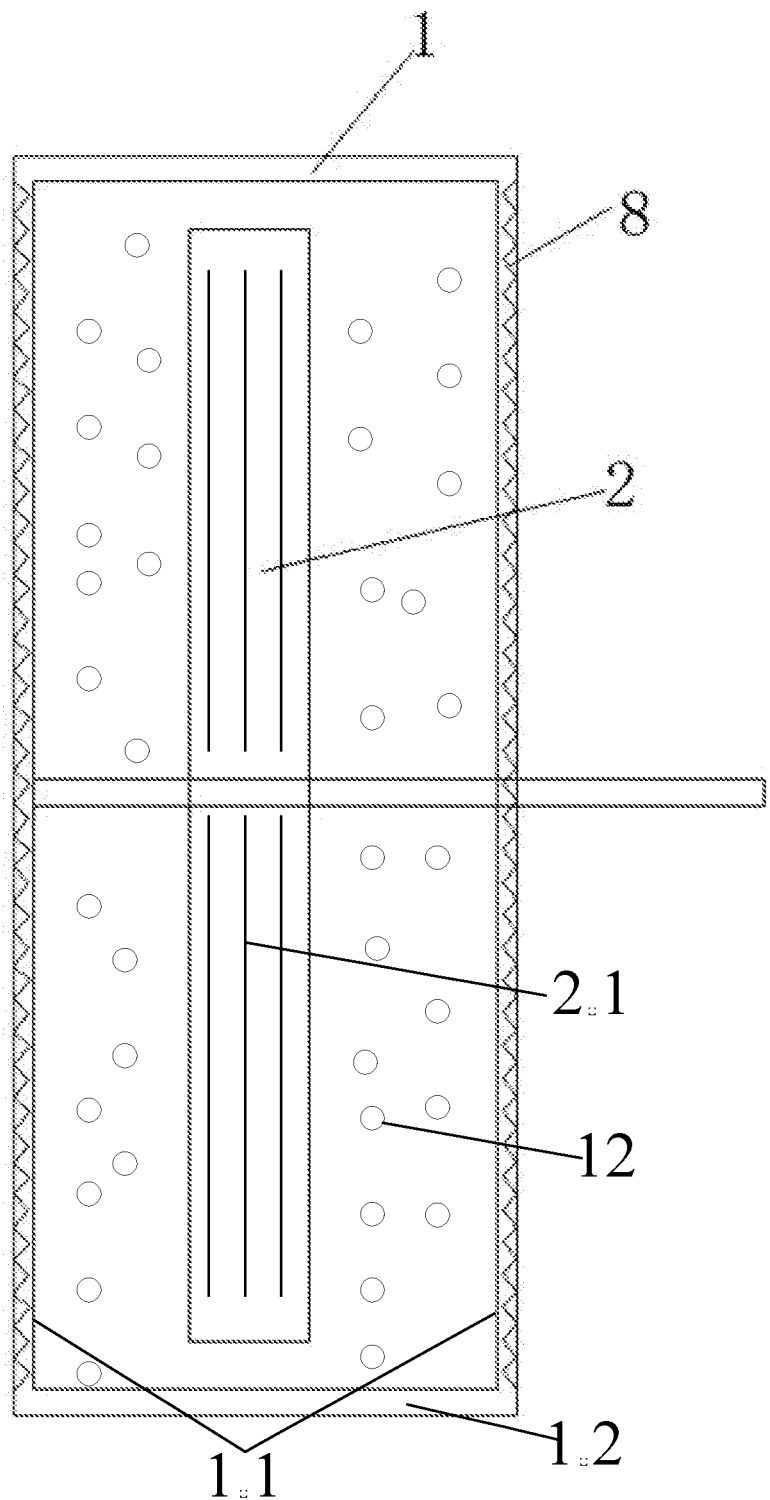
FIG. 2 is a structural schematic diagram of a magnetorheological fluid tank of an active composite variable damping rotational control device in one embodiment.
Figure 3:
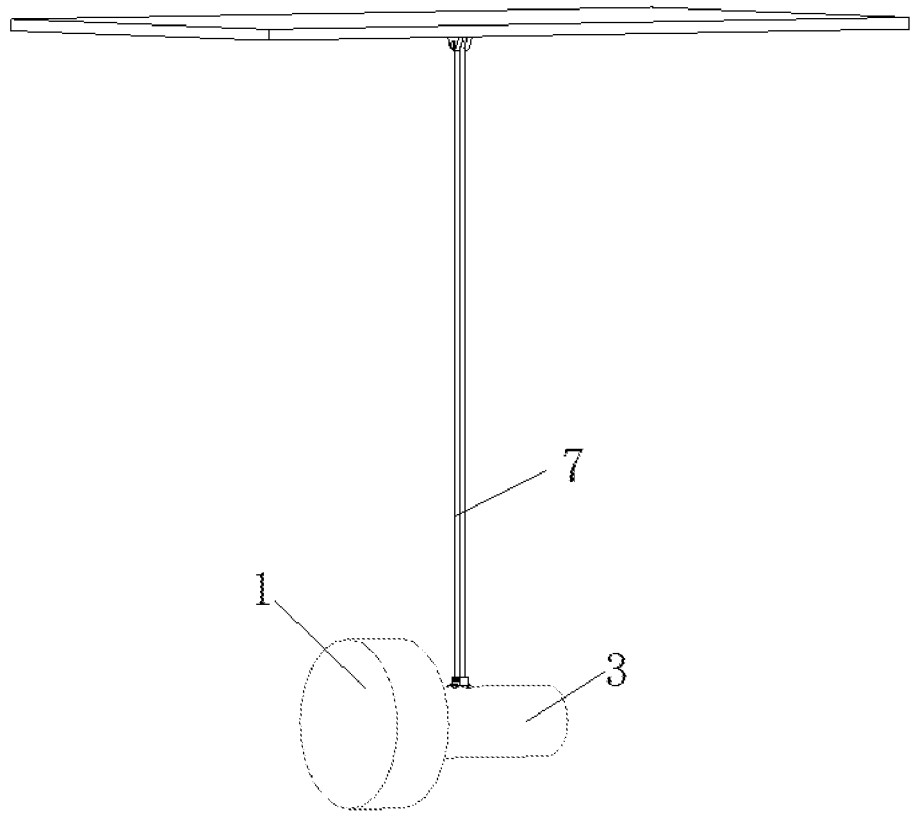
FIG. 3 is a structural schematic diagram of an active composite variable damping rotational control device assembled with a simple pendulum structure in one embodiment.

As shown in FIGS. 1-3, an active composite variable damping rotational control device of the present invention includes a variable damping module 100 and a power module 200. The variable damping module 100 includes a magnetorheological fluid tank 1 and a rotational inertia wheel 2. The power module 200 includes a device tubular cavity 3, and a driver 4, an encoder 5 and a speed changer 6 which are fixed in the device tubular cavity 3. The device tubular cavity 3 is connected with a controlled structure 7. The rotational inertia wheel 2 is parallel to a surface of the controlled structure 7 that is subjected to the torsional swing.

The magnetorheological fluid tank 1 is a round tubular shape. Two circular end surfaces 1.1 and a cylinder 1.2 are encircled to form a closed space. The magnetorheological fluid tank 1 is fully filled with magnetorheological fluid 12. The rotational inertia wheel 2 is arranged in the magnetorheological fluid tank 1. The rotational inertia wheel 2 is surrounded by the magnetorheological fluid 12. The rotational inertia wheel 2 is a round disc shape recessed inwards in the middle. The outer surface of the rotational inertia wheel 2 is provided with strip-shaped grooves or projections 2.1. The strip-shaped grooves or projections 2.1 are used to increase a frictional and contact area between the rotational inertia wheel 2 and the magnetorheological fluid 12. The two circular end surfaces 1.1 of the magnetorheological fluid tank 1 are provided with an electromagnetic gauze 8 respectively. The electromagnetic gauze 8 is connected with a controller 9 through a circuit. The controller 9 is also connected with the driver 4 and the encoder 5 through a circuit.

The device tubular cavity 3 is of a cylindrical shape. The device tubular cavity 3 is fixed perpendicularly at the centers of the circular end surfaces 1.1 of the magnetorheological fluid tank 1. The driver 4 is fixed on the inner wall of the device tubular cavity 3 through a driver support 10. One end, away from the variable damping module 100, of the driver 4 is provided with the encoder 5, and one end, facing the variable damping module 100, of the driver 4 is connected with the speed changer 6. The driver 4, the speed changer 6 and the encoder 5 are coaxial. The driver 4 has a driving shaft 4.1. The driving shaft 4.1 of the driver 4 passes through the speed changer 6 and extends into the magnetorehological fluid tank 1 to be fixed perpendicularly at the center of the rotational inertia wheel 2 through a flange coupler disc 11.

In the present embodiment, besides the encoder 5 arranged on one end of the variable damping module 100 away from the driver 4 and used to collect rotational data of the driver 4, a suspension point of the controlled structure 7 is also provided with a sensor. The sensor is used to collect state data of a swinging motion of the controlled structure 7. The sensor herein can adopt but is not limited to a photoelectric axis-angle encoder, an angle acceleration sensor or a gyroscope.

An action principle of the present invention is as follows:

The sensor arranged at the suspension point of the controlled structure 7 collects the state data of the swinging motion of the controlled structure 7, i.e. a swinging angle and swinging angle acceleration data and transmits the state data of the swinging motion of the controlled structure 7 to the controller 9. The controller 9 judges whether the active control is performed for the controlled structure 7. When the state data of the swinging motion of the controlled structure 7 exceeds a threshold value set by the controller 9 before, the controller 9 controls the driver 4 to act. The encoder 5 coaxially mounted on one end of the driver 4 away from the variable damping module 100 collects the rotational data of the driver 4 in real time, and the encoder 5 feeds back the rotational data of the driver 4 to the controller 9, so that the closed-loop control of the controller 9 and the controlled structure 7 as well as the driver 4 is realized. The driver 4 can control the rotational inertia wheel 2 to rotate according to the state data of the swinging motion of the controlled structure 7 measured by the sensor in real time, and at the same time, by controlling the current of the electromagnetic gauze 8, appropriate magnetic field intensity is obtained to match the rotational damping of the rotational inertial wheel 2. A counteracting force generated by the rotation of the rotational inertia wheel 2 acts on the device tubular cavity 3, and then the counteracting force is transferred onto the controlled structure 7 connected with the device tubular cavity 3 through the device tubular cavity 3 so as to suppress the swing of the controlled structure 7.

The present invention utilizes a magnetic effect of the current and the basic principle of the magnetorheological fluid, collects the state data of the swinging motion of the controlled structure 7 in real time through the sensor, and changes a rotational rate and the rotational damping of the rotational inertia wheel 2 controlled by the driver 4 in real time to adjust a control torque acting on the controlled structure 7, and controls the vibration of the controlled structure 7 by adjusting the output of the driver 4, thereby ensuring that the driver 4 has high control efficiency for the controlled structure 7.

The device can be applied to but is not limited to the basic prototype motion model of the following mechanical problems: free swing of the single pendulum structure; vibration of a constrained inverted pendulum structure; fixed-axis rotation of a rigid body around any axis of the space such as the swing of suspension structures (hooks, cranes, etc.); torsional swing of irregular buildings under the action of wind load; torsional swing of offshore platforms under the coupled effect of ocean waves, wind, ice, etc.; torsional swing of spacecrafts and space structures caused by the pose adjustment and the opening of a solar panel in the running process; and torsional swing of a vehicle body of high-speed railway locomotives caused by small excitation in the high-speed running process.

The above only describes preferred embodiments of the present invention and is not used to limit the present invention. For those skilled in the art, various changes and variations of the present invention can be made. Any modifications, equivalent substitution and improvements made within the spirit and principle of the present invention shall be included within the protection scope of the present invention.

What is claimed is:

1. An active composite variable damping rotational control device, comprising: a variable damping module (100) and a power module (200), wherein the variable damping module (100) comprises a magnetorheological fluid tank (1) and a rotational inertia wheel (2); the magnetorheological fluid tank (1) is of a round tube shape; the magnetorheological fluid tank (1) is fully filled with magnetorheological fluid (12); the rotational inertia wheel (2) is arranged in the magnetorheological fluid tank (1); the rotational inertia wheel (2) is surrounded by the magnetorheological fluid (12); two circular end surfaces (1.1) of the magnetorheological fluid tank (1) are respectively provided with an electromagnetic gauze (8);

the power module (200) comprises a device tubular cavity (3), and a driver (4), an encoder (5) and a speed changer (6) which are fixed in the device tubular cavity (3); the device tubular cavity (3) is of a cylindrical shape; the device tubular cavity (3) is fixed perpendicularly at the centers of the circular end surfaces (1.1) of the magnetorheological fluid tank (1); the driver (4) is fixed on the inner wall of the device tubular cavity (3); one end, away from the variable damping module (100), of the driver (4) is provided with the encoder (5), and one end, facing the variable damping module (100), of the driver (4) is connected with the speed changer (6); the driver (4) has a driving shaft (4.1); the driving shaft (4.1) of the driver (4) passes through the speed changer (6) and extends into the magnetorehological fluid tank (4.1) to be fixed perpendicularly at the center of the rotational inertia wheel (2).

2. The active composite variable damping rotational control device according to claim 1, further comprising a driver support (10), wherein the driver (4) is fixed on the inner wall of the device tubular cavity (3) through the driver support (10).

3. The active composite variable damping rotational control device according to claim 1, further comprising a controller (9), wherein the controller (9) is connected with the electromagnetic gauze (8), the driver (4) and the encoder (5) through circuits.

4. The active composite variable damping rotational control device according to claim 1, wherein the rotational inertia wheel (2) is a circular disc shape recessed inwards in the middle; the outer surface of the rotational inertia wheel (2) is provided with strip-shaped grooves or projections (2.1); and the strip-shaped grooves or projections (2.1) are used to increase a frictional and contact area between the rotational inertia wheel (2) and the magnetorheological fluid (12).

5. The active composite variable damping rotational control device according to claim 1, wherein the driving shaft (4.1) of the driver (4) is connected with the rotational inertial wheel (2) through a flange coupler disc (11).

6. The active composite variable damping rotational control device according to claim 1, wherein the device tubular cavity (3) is connected with a controlled structure (7); and the rotational inertia wheel (2) is parallel to a surface of the controlled structure (7) that is subjected to the torsional swing.

7. The active composite variable damping rotational control device according to claim 1, wherein the driver (4), the speed changer (6) and the encoder (5) are coaxial.

8. The active composite variable damping rotational control device according to claim 1, wherein the speed changer (6) is a speed reducer.

9. The active composite variable damping rotational control device according to claim 1, wherein the driver (4) is a servo motor or a stepper motor.

\* \* \* \* \*